US012280489B2

(12) United States Patent
Hashiguchi

(10) Patent No.: US 12,280,489 B2
(45) Date of Patent: Apr. 22, 2025

(54) ROBOT, COMMUNICATION SYSTEM, COMMUNICATION METHOD, AND COMPUTER READABLE MEDIUM

(71) Applicant: TOYOTA JIDOSHA KABUSHIKI KAISHA, Toyota (JP)

(72) Inventor: Yuka Hashiguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 17/696,458

(22) Filed: Mar. 16, 2022

(65) Prior Publication Data
US 2022/0305665 A1 Sep. 29, 2022

(30) Foreign Application Priority Data

Mar. 24, 2021 (JP) ................................ 2021-049878

(51) Int. Cl.
*B25J 11/00* (2006.01)
*B25J 19/02* (2006.01)
(Continued)

(52) U.S. Cl.
CPC ......... *B25J 11/0015* (2013.01); *B25J 19/023* (2013.01); *G06F 21/6245* (2013.01); *G06V 40/161* (2022.01); *G06F 2221/2143* (2013.01)

(58) Field of Classification Search
CPC .. B25J 11/0015; B25J 19/023; B25J 11/0005; B25J 11/00; B25J 19/00; G06F 21/6245; G06F 2221/2143; G06V 40/161
See application file for complete search history.

(56) References Cited

U.S. PATENT DOCUMENTS

| 10,898,999 B1* | 1/2021 | Cohen | B25J 9/0003 |
| 2013/0057746 A1* | 3/2013 | Takaoka | G06V 20/20 |
| | | | 348/E5.022 |

(Continued)

FOREIGN PATENT DOCUMENTS

| CN | 204790566 U | * 11/2015 | |
| CN | 107103029 A | * 8/2017 | G06F 16/583 |

(Continued)

OTHER PUBLICATIONS

CN107103029A_ImageDataProcessing MethodForRobots (Year: 2017).*

(Continued)

*Primary Examiner* — Ramon A. Mercado
*Assistant Examiner* — Shaheda Hoque
(74) *Attorney, Agent, or Firm* — Dinsmore & Shohl LLP

(57) ABSTRACT

A robot, a communication system, a communication method, and a program capable of effectively indicating to a communication target person that he/she is a person a communication target are provided. A robot according to the embodiment includes a specifying unit configured to specify a communication target person to be communicated with from among persons present in the vicinity of the robot, an acquisition unit configured to acquire personal information related to the communication target person specified by the specifying unit, and a display processing unit configured to display the personal information on a display unit so that a set of protection processing for protecting the personal information and processing for displaying the personal information is executed.

9 Claims, 10 Drawing Sheets

(51) Int. Cl.
*G06F 21/62* (2013.01)
*G06V 40/16* (2022.01)

(56) References Cited

U.S. PATENT DOCUMENTS

| 2015/0032254 | A1 |   | 1/2015 | Ishiguro |           |
|---|---|---|---|---|---|
| 2019/0238793 | A1 | * | 8/2019 | Kasahara | H04L 65/1069 |
| 2020/0269436 | A1 | * | 8/2020 | Sasagawa | H04R 1/028 |
| 2021/0064876 | A1 | * | 3/2021 | Katagiri | G06V 40/10 |
| 2021/0217414 | A1 | * | 7/2021 | Hara | G10L 15/1815 |

FOREIGN PATENT DOCUMENTS

| CN | 107103029 | B | * | 8/2021 | G06F 16/583 |
|---|---|---|---|---|---|
| JP | 2005329515 | A | * | 12/2005 | |
| JP | 2009166184 | A | * | 7/2009 | |
| JP | 2011128911 | A | * | 6/2011 | |
| JP | 2011152593 | A | * | 8/2011 | |
| JP | 2016115257 | A | * | 6/2016 | |
| JP | 2019217558 | A | * | 12/2019 | |
| JP | 2020182092 | A | * | 11/2020 | |
| JP | 2021033752 | A | * | 3/2021 | G06F 3/14 |
| JP | 2022054294 | A | * | 4/2022 | |
| JP | 7074716 | B2 | * | 5/2022 | |
| JP | 2022078760 | A | * | 5/2022 | B25J 11/0015 |
| JP | 7354686 | B2 | * | 10/2023 | G06F 3/14 |
| JP | 7574027 | B2 | * | 10/2024 | |
| WO | 2013/114493 | A1 |   | 8/2013 | |
| WO | WO-2016065362 | A1 | * | 4/2016 | B25J 11/008 |
| WO | 2019/225201 | A1 |   | 11/2019 | |

OTHER PUBLICATIONS

JP2022078760A_RemoteControlSystemMobile RobbotAndOperatingTerminal (Year: 2022).*
JP2022078760A_RemoteControlSystemMobileRobbotAndOperatingTerminal_Drawings (Year: 2022).*
T. Kanda, T. Hirano, D. Eaton and H. Ishiguro, "Person identification and interaction of social robots by using wireless tags," Proceedings 2003 IEEE/RSJ International Conference on Intelligent Robots and Systems (IROS 2003) (Cat. No. 03CH37453), Las Vegas, NV, USA, 2003, pp. 1657-1664 vol. 2 (Year: 2003).*
Lin et al., Learning Correspondence Structures for Person Re-identification (Year: 2017).*
JP_2016115257A (Year: 2016).*
JP_2016115257A_Drawings (Year: 2016).*

* cited by examiner

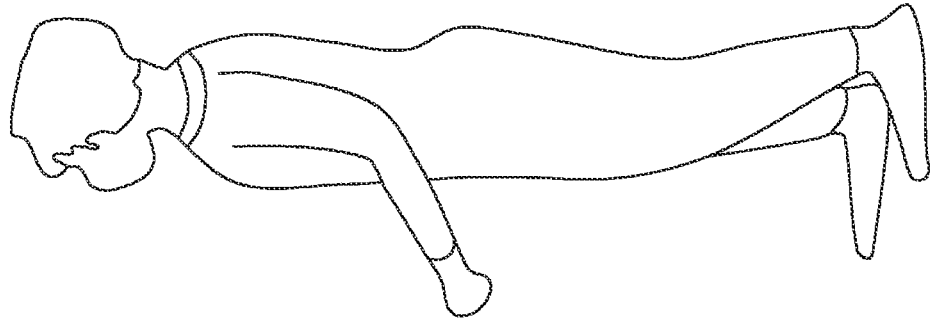
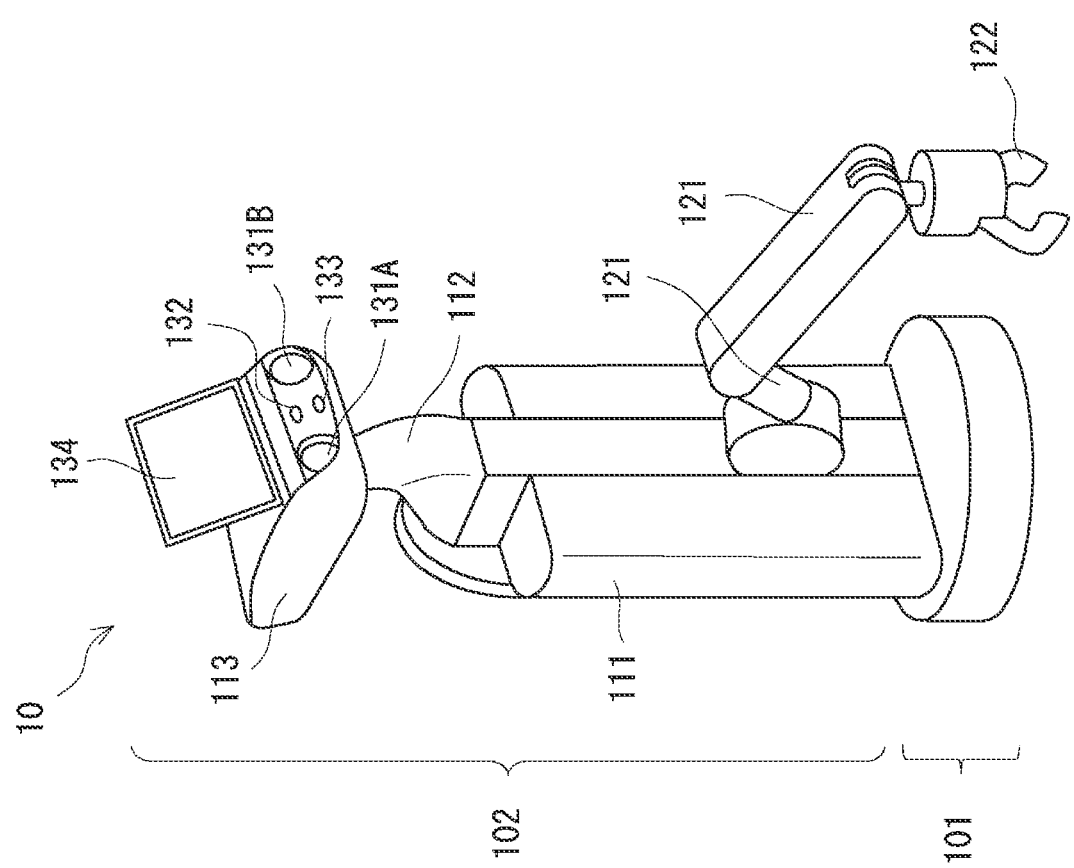
Fig. 2

ROBOT, COMMUNICATION SYSTEM, COMMUNICATION METHOD, AND COMPUTER READABLE MEDIUM

CROSS REFERENCE TO RELATED APPLICATIONS

This application is based upon and claims the benefit of priority from Japanese patent application No. 2021-049878, filed on Mar. 24, 2021, the disclosure of which is incorporated herein in its entirety by reference.

BACKGROUND

The present disclosure relates to a robot, a communication system, a communication method, and a program.

Recently, advancements in technologies of communication between humans and robots has been made. For example, International Patent Publication No. WO2013/114493 describes that a robot equipped with a communication system emits light to a specified communication target person. By doing so, the communication target person can be made to recognize that the robot will communicate with him/her.

SUMMARY

In the technique described above, it is assumed that there is a possibility that light may not be applied with pinpoint accuracy to a specified communication target person. For example, when there are many people in the vicinity of the robot, the applied light may be blocked by other people, and thus the communication target person may not notice the applied due to him/her being distracted by something or someone else. In such a case, it is impossible to effectively indicate to the communication target person that he/she is a communication target.

The present disclosure has been made to solve such a problem, and provides a robot, a communication system, a communication method, and a program capable of effectively indicating to a communication target person that he/she is a communication target.

In an example aspect of the present disclosure, a robot includes: a specifying unit configured to specify a communication target person to be communicated with from among persons present in the vicinity of the robot; an acquisition unit configured to acquire personal information related to the communication target person specified by the specifying unit; and a display processing unit configured to display the personal information on a display unit so that a set of protection processing for protecting the personal information and processing for displaying the personal information is executed. Thus, the robot can effectively make the communication target person visually recognize the information about the communication target person, so that the robot can effectively indicate to the communication target person that he/she is a communication target. Further, since it becomes difficult for a third party to specify an individual based on display data of the robot, the communication target person can communicate with the robot with a sense of security.

In the above robot, the personal information may include a face image of the communication target person, and the protection processing may be for creating a processed image obtained by processing the face image, and the display processing unit may cause the display unit to display the processed image. By doing so, the robot can further reduce the possibility that an individual may be specified by a third party.

In the above robot, the personal information may include a face image of the communication target person, and the display processing unit may execute processing for deleting data of the face image from the robot as the protection processing after causing the display unit to display the face image. In this way, since the robot can give the communication target person a sense of security that the personal information is appropriately managed, the communication target person can communicate with the robot with a sense of security.

In the above robot, the acquisition unit may include an imaging unit configured to capture the face image. Thus, the robot alone can effectively indicate to the communication target person using the face image that he/she is a communication target.

In the above robot, the specifying unit may be configured to further specify position information of the communication target person, and the display processing unit may cause the display unit to display the position information together with the personal information. In this manner, the robot can more effectively indicate to the communication target person that the he/she is a communication target.

In the above robot, the specifying unit may be configured to specify the communication target person based on a distance between the person present in the vicinity of the robot and the robot. Thus, the robot can accurately determine the communication target person who is trying to communicate with the robot.

In another example of the present disclosure, a robot includes: an imaging unit configured to capture an image of a person present in the vicinity of the robot; a transmission unit configured to transmit captured data captured by the imaging unit to a remote apparatus; a reception unit configured to receive, from the remote apparatus, specifying information for specifying a communication target person to be communicated with from among persons present in the vicinity of the robot; and a display processing unit configured to display, on a display unit, personal information related to the communication target person specified by the specifying information. Thus, the robot can effectively make the communication target person visually recognize the information about the communication target person, so that the robot can effectively indicate to the communication target person that he/she is a communication target.

The above robot may further include an extraction unit configured to extract at least a part of the person as a person area from the captured data, and the transmission unit may be configured to transmit information indicating the person area to the remote apparatus together with the captured data. In this manner, the operator can easily select the communication target person from among the persons displayed on the display unit of the remote apparatus by the information indicating the person area.

The above robot further may include an extraction unit configured to extract at least a part of the person who is a candidate for the communication target person as a person area from the captured data based on a distance between the person present in the vicinity of the robot and the robot, and the transmission unit may be configured to transmit information indicating the person area to the remote apparatus together with the captured data. In this manner, the operator can easily select the communication target person from among the persons displayed on the display unit of the remote apparatus by the information indicating the person area. In addition, the robot previously selects a person who is considered to be trying to communicate with the robot in consideration of the distance to the robot. Thus, the operator can more accurately select the person who is trying to communicate as the communication target person.

In another example aspect of the present disclosure, a communication system includes: a robot; a remote apparatus configured to remotely operate the robot; and an imaging apparatus configured to capture an image of a person present in the vicinity of the robot and acquire captured data. The robot includes: a reception unit configured to receive, from the remote apparatus, specifying information for specifying a communication target person to be communicated with from among persons present in the vicinity of the robot; an acquisition unit configured to acquire personal information related to the communication target person specified by the reception unit; and a display processing unit configured to display the personal information through a display unit of the robot. The remote apparatus includes: a display unit configured to display the transmitted captured data to an operator; and a specifying information transmission unit configured to transmit the specifying information related to the communication target person designated by the operator to the robot. Thus, the robot can effectively make the communication target person visually recognize the information about the communication target person, so that the robot can effectively indicate to the communication target person that he/she is a communication target.

In the above communication system, the imaging apparatus or the robot may be configured to extract at least a part of the person as a person area from the captured data, and information indicating the person area may be transmitted to the remote apparatus together with the captured data, and the display unit of the remote apparatus may be configured to display the captured data and data indicating the person area to the operator, or the remote apparatus may be configured to extract at least a part of the person as the person area from the captured data, and the display unit of the remote apparatus may be configured to display the captured data and information indicating the person area to the operator. In this manner, the operator can easily select the communication target person from among the persons displayed on the display unit of the remote apparatus by the information indicating the person area.

In the above communication system, the imaging apparatus or the robot is configured to extract at least a part of the person who is a candidate for the communication target person as a person area from the captured data based on a distance between the person present in the vicinity of the robot and the robot, and information indicating the person area is transmitted to the remote apparatus together with the captured data, and the display unit of the remote apparatus is configured to display the captured data and the information indicating the person area to the operator, or the remote apparatus is configured to extract at least a part of the person who is the candidate for the communication target person as the person area from the captured data based on the distance between the person present in the vicinity of the robot and the robot, and the display unit of the remote apparatus is configured to display the captured data and information indicating the person area to the operator. In this manner, the operator can easily select the communication target person from among the persons displayed on the display unit of the remote apparatus by the information indicating the person area. Thus, the operator can more accurately select the person who is trying to communicate as the communication target person.

In another example aspect of the present disclosure, a communication method executed by a robot includes: specifying a communication target person to be communicated with from among persons present in the vicinity of the robot; acquiring personal information related to the specified communication target person; and displaying the personal information on a display unit so that a set of protection processing for protecting the personal information and processing for displaying the personal information is executed. Thus, the robot can effectively make the communication target person visually recognize the information about the communication target person, so that the robot can effectively indicate to the communication target person that he/she is a communication target. Further, since it becomes difficult for a third party to specify an individual based on display data of the robot, the communication target person can communicate with the robot with a sense of security.

In another example aspect of the present disclosure, a communication method executed by a robot includes: capturing an image of a person present in the vicinity of the robot; transmitting captured data to a remote apparatus; receiving, from the remote apparatus, specifying information for specifying a communication target person to be communicated with from among persons present in the vicinity of the robot; and displaying, on a display unit, personal information related to the specified communication target person. Thus, the robot can effectively make the communication target person visually recognize the information about the communication target person, so that the robot can effectively indicate to the communication target person that he/she is a communication target.

In another example aspect of the present disclosure, a program causes a robot to execute: a specifying a communication target person to be communicated with from among persons present in the vicinity of the robot; acquiring personal information related to the specified communication target person; and displaying the personal information on a display unit so that a set of protection processing for protecting the personal information and processing for displaying the personal information is executed. Thus, the robot can effectively make the communication target person visually recognize the information about the communication target person, so that the robot can effectively indicate to the communication target person that he/she is a communication target. Further, since it becomes difficult for a third party to specify an individual based on display data of the robot, the communication target person can communicate with the robot with a sense of security.

In another example aspect of the present disclosure, a program causes a robot to execute: capturing an image of a person present in the vicinity of the robot; transmitting captured data to a remote apparatus; receiving, from the remote apparatus, specifying information for specifying a communication target person to be communicated with from among persons present in the vicinity of the robot; and displaying, on a display unit, personal information related to the specified communication target person. Thus, the robot can effectively make the communication target person visually recognize the information about the communication target person, so that the robot can effectively indicate to the communication target person that he/she is a communication target.

According to the present disclosure, it is possible to provide a robot, a communication system, a communication method, and a program capable of effectively indicating to a communication target person that he/she is a person a communication target.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 2 shows an example of an external configuration of a robot according to the first embodiment;

DESCRIPTION OF EMBODIMENTS

First Embodiment

Embodiments of the present disclosure will be described below with reference to the drawings.

First, a configuration and an operation of a communication system according to this embodiment will be described with reference to FIGS. 1 to 5. The operation of the entire communication system according to this embodiment will be described with reference to FIGS. 6A and 6B.

<Communication System>

Figure 1:
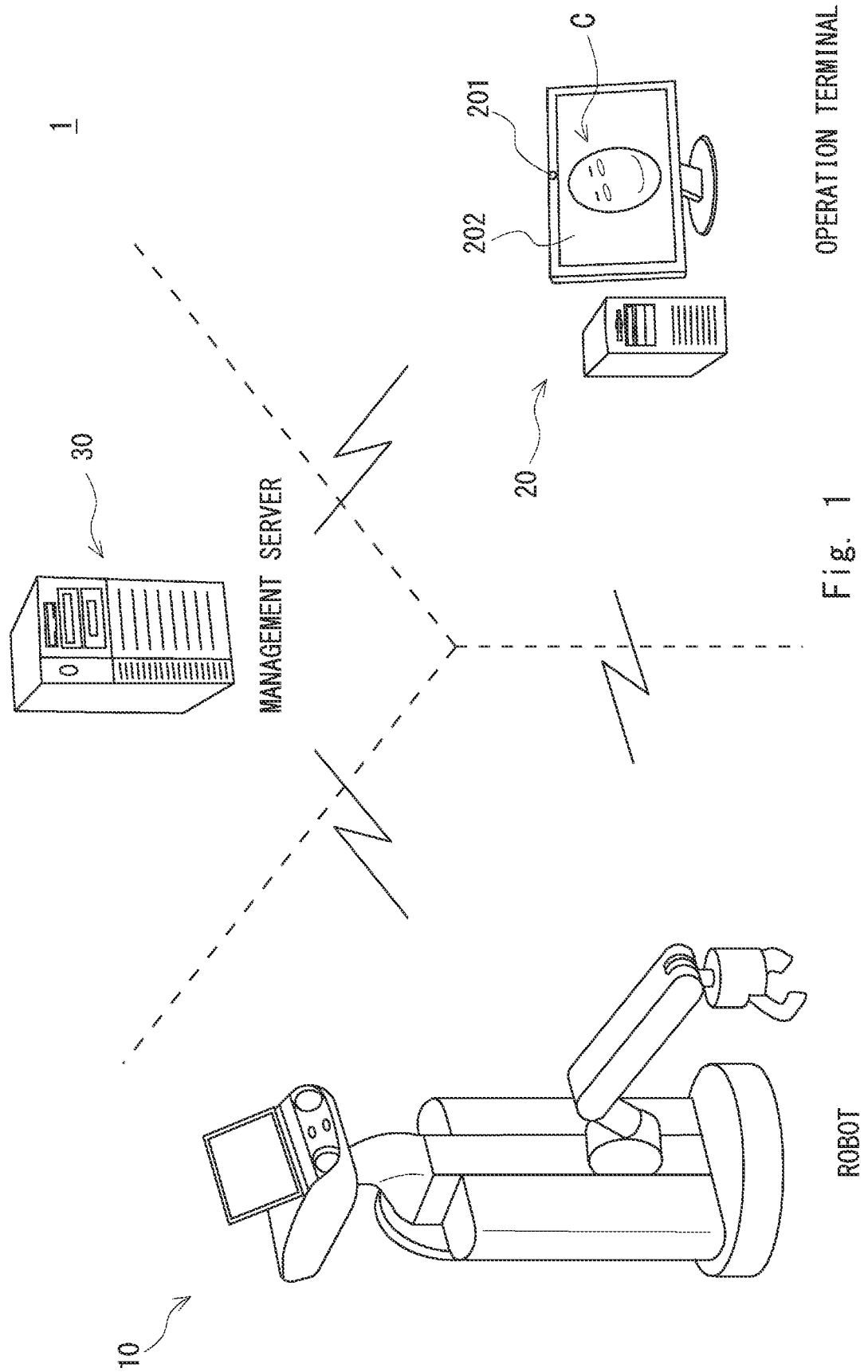
FIG. 1 is a schematic diagram showing an example of a communication system according to a first embodiment.

FIG. 1 is a diagram for explaining a communication system according to the embodiments. As shown in FIG. 1, a communication system 1 according to this embodiment includes a robot 10, an operation terminal 20 (a remote apparatus), and a management server 30. In the communication system 1 according to this embodiment, the robot 10 remotely operated by the operation terminal 20 communicates with a target person C who is a service user (see FIG. 2) present in the vicinity of the robot 10 through conversation or the like.

The robot 10 can guide the target person C to a venue, advertise an event or the like to the target person C, and perform other processing when the robot 10 is placed in the venue such as the event. A display panel, a microphone, and a speaker are mounted on the robot 10 for communication. The specific configuration of the robot 10 will be described later.

The robot 10 and the operation terminal 20 are disposed at positions separated from each other, and an operator can remotely operate the robot 10 using the operation terminal 20. As will be described later, the robot 10 and the operation terminal 20 are configured to be capable of communicating with each other regarding an operation instruction for the robot 10, video data, voice data, and so on. The robot 10 and the management server 30, and the operation terminal 20 and the management server 30 are also configured to be capable of communicating with each other. The management server 30 may be disposed at a position separated from the robot 10 and the operation terminal 20, near the operation terminal 20, or near the robot 10. The configuration and operation of the communication system 1 according to this embodiment will be described in detail below.

<External Configuration of Robot>

First, an external configuration of the robot 10 will be described. As shown in FIG. 2, the robot 10 includes a moving unit 101 and a main body unit 102.

The moving unit 101 is a unit for moving the robot 10. For example, wheels (not shown) are provided on a lower surface of the moving unit 101, and by driving the wheels, the robot 10 can freely move or rotate on a plane. A direction of the movement or rotation, a velocity, stop, etc. of the moving unit 101 are controlled by a control signal from the operation terminal 20. By rotating the robot 10, the direction in which a head part 113 is directed can be changed, that is, a target person with which the robot 10 communicates can be changed.

The main body unit 102 is mounted above the moving unit 101 and has a trunk part 111, a connection part 112 and the head part 113. The trunk part 111 is mounted above the moving unit 101, and the connection part 112 connects the trunk part 111 to the head part 113.

The trunk part 111 includes an arm 121 supported on a front face and a hand 122 installed at a leading end of the arm 121. The arm 121 and the hand 122 are driven by a control signal from the operation terminal 20 through a motor (not shown) to hold various objects in a controlled posture and to perform gestures expressing emotions. For example, by the arm 121 and the hand 122 operating in association with each other, the hand 122 may be controlled to grasp goods such as brochures and snacks near the robot 10, move them to the front of a person communicating with the robot 10, and pass them to the person.

The head part 113 includes a stereo camera 131 (an acquisition unit, imaging unit, or an imaging apparatus), a microphone 132, a speaker 133, and a display panel 134, and has a configuration for communicating with a communication target person C (hereinafter referred to as a target person C). The specific configuration of the head part 113 will be described below.

The stereo camera 131 has a configuration in which two camera units 131A and 131B having the same angle of view are disposed apart from each other, and generates an image captured by each camera unit as captured data. The captured data may be a still image or a moving image. In this way, the stereo camera 131 captures a person present in the vicinity of the robot 10. Note that the stereo camera 131 can detect not only the presence of a person (a candidate for a communication target) in the vicinity of the robot 10, but also the distance to the robot 10 to the person. The robot 10 transmits the captured data and information about a distance to the operation terminal 20.

The microphone 132 converts sound generated in the vicinity of the robot 10 and a voice of the person into voice data. The robot 10 transmits the voice data to the operation terminal 20.

The speaker 133 may select the voice data stored by the robot 10 in response to an instruction from the operation terminal 20 and output the voice, or may output a voice generated in response to the instruction from the operation terminal 20. Further, the voice data received from the operation terminal 20 can be converted into an actual voice and the converted voice may be output.

The display panel 134 is, for example, a liquid crystal panel and displays a face image (an actual image of a captured face image or processed image generated based on the captured face image) to the target person C. By displaying the face image which is the actual image or the face image which is the processed image on the display panel 134, an impression that the display panel 134 is a pseudo face part can be given to the target person C. In addition, the display panel 134 can display text information, picture information (e.g., icons), and the like to inform the target person C. The above-described face image, text information, and picture information displayed on the display panel 134 may be stored or generated by the robot 10, or may be received as display data from the operation terminal 20.

A touch panel may be provided on a display surface of the display panel 134 to receive an instruction input from the target person C. The robot 10 may perform an operation in response to the received instruction input or transmit the instruction to the operation terminal 20.

The direction in which the head part 113 faces can be changed by the moving unit 101 changing the orientation of the robot 10. By doing so, the stereo camera 131 can capture an image of a target in any direction, and the microphone 132 can acquire voice data from any direction. The speaker 133 and the display panel 134 can output a voice in any direction and present display details in any direction.

<System Configuration of Robot>

Figure 3:
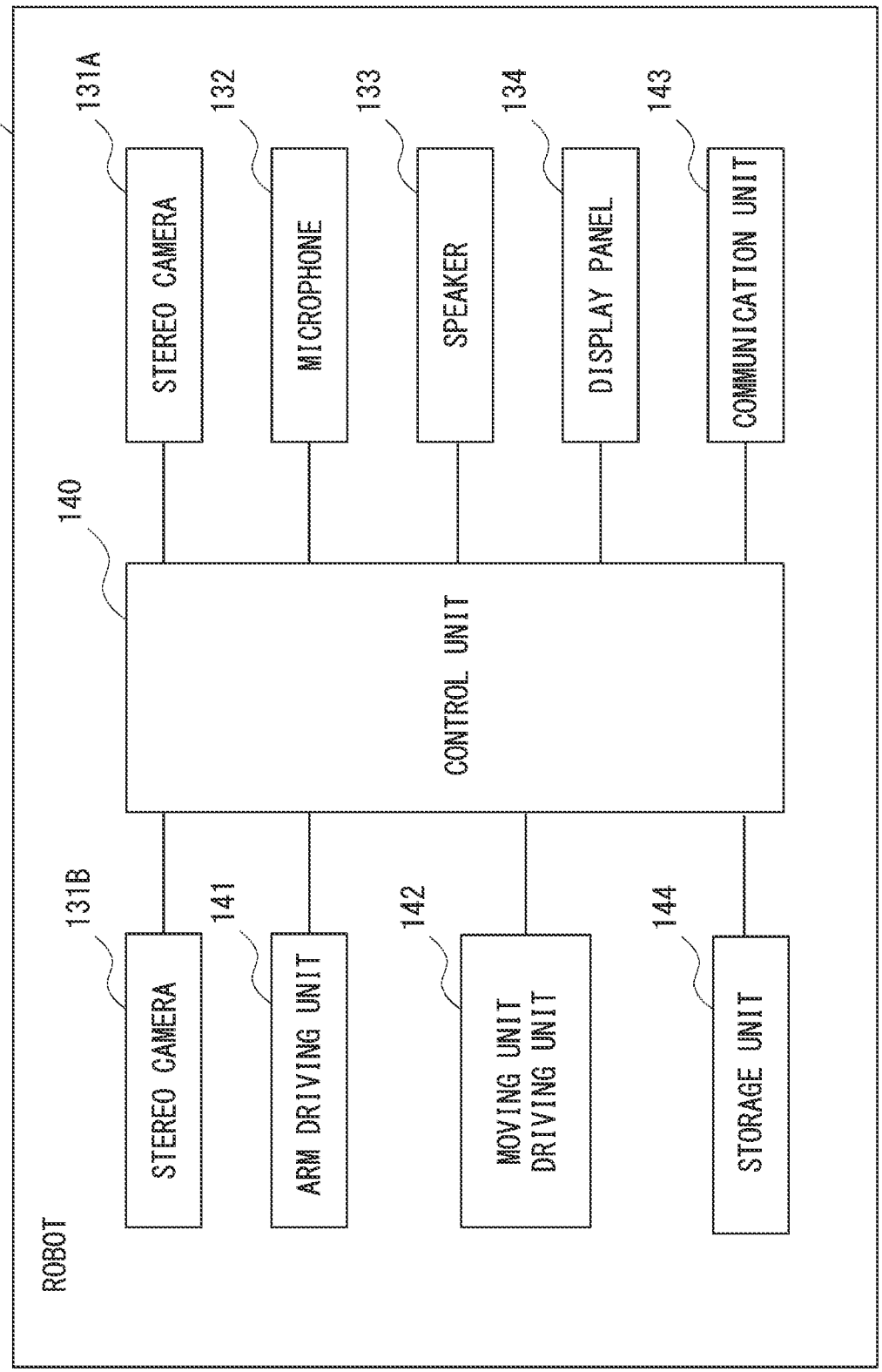
FIG. 3 is a block diagram showing an example of the robot according to the first embodiment.

Next, a system configuration of the robot 10 will be described. FIG. 3 is a block diagram for explaining a system configuration of the robot. As shown in FIG. 3, in addition to the stereo camera 131, the microphone 132, the speaker 133, and the display panel 134, the robot 10 further includes a control unit 140 (a display processing unit and an extraction unit), an arm driving unit 141, a moving unit driving unit 142, a communication unit 143 (a transmission unit and a reception unit), and a storage unit 144.

The control unit 140 controls processing of each unit of the robot 10, and is connected to each of the components other than itself through a bus.

The control unit 140 transmits the captured data acquired from the stereo camera 131 and the voice data acquired from the microphone 132 (e.g., image data and voice data of a person) to the operation terminal 20 through the communication unit 143. If necessary, the control unit 140 may store the captured data and the voice data acquired from the stereo camera 131 and the microphone 132 in the storage unit 144. The control unit 140 can read out and use or delete any data stored in the storage unit 144.

For example, the control unit 140 can display the captured data captured by the stereo camera 131 on the display panel 134. The control unit 140 may extract an actual face image part of the selected target person C from the captured data and display the face image on the display panel 134. Further, the control unit 140 may create a processed image obtained by performing processing, which is protection processing, on the face image of the target person C and then display the processed face image on the display panel 134. The processed image may be, for example, a filtered actual face image or a caricature or an avatar based on the actual face image. The control unit 140 can generate the processed image using known processing.

Further, the control unit 140 may extract at least a part of the person reflected in the captured data as a person area based on the captured data acquired from the stereo camera 131. In order to detect the presence of a person, the control unit 140 can use known techniques such as face detection (detection of an entire face or a part of the face), face recognition, person detection, and person tracking in a moving image.

The control unit 140 can also calculate a distance between the person and the robot 10 (hereinafter referred to as a distance to the person) using a known measurement technique. Note that the control unit 140 may extract the voice data of the person reflected in the captured data from the voice data acquired from the microphone 132, and further use the voice data to calculate the distance to the person.

The control unit 140 may transmit, to the operation terminal 20, information indicating the person area and the calculated distance to the person through the communication unit 143 together with the captured data acquired from the stereo camera 131. For example, when a face of a person is detected in the captured data, the control unit 140 marks the face with a figure such as a rectangle to surround the face as information indicating the person area. The detected distance to a certain person is added to the captured data so that the distance to the certain person is displayed near the person's face. The control unit 140 transmits the captured data subjected to the processing for adding above-described information to the operation terminal 20. It is needless to say that the captured data to be transmitted may include information indicating the presence of a plurality of persons and information related to the distances of the respective persons.

The control unit 140 outputs, from the speaker 133 as a voice, the voice data received from the operation terminal 20 through the communication unit 143. The control unit 140 controls the display panel 134 to display the display data received from the operation terminal 20 through the communication unit 143. The control unit 140 may select the voice data and the display data stored in the storage unit 144 in response to an instruction from the operation terminal 20 and output them from the speaker 133 and the display panel 134, respectively. If necessary, the control unit 140 may store the voice data and the display data received from the operation terminal 20 in the storage unit 144.

The control unit 140 outputs a control signal to the arm driving unit 141 to drive the arm 121 and the hand 122. By doing so, the arm part of the robot 10 can be moved in any manner. For example, the control unit 140 can perform a handshake operation by extending the arm 121 forward to the target person C, an image of whom has been captured by the stereo camera 131, based on an operation signal transmitted from the operation terminal 20 (or the management server 30).

The control unit 140 outputs a control signal to the moving unit driving unit 142 to drive the moving unit 101. By doing so, the robot 10 can be moved in any manner. For example, the control unit 140 can generate the control signal for controlling the moving unit 101 based on the operation signal transmitted from the operation terminal 20 (or the management server 30). Further, the control unit 140 may detect an obstacle in the vicinity of the robot 10 using the information acquired from the stereo camera 131 and the microphone 132, and generate the control signal using information about the detected obstacle. In this manner, the moving unit 101 can be controlled so that the robot 10 moves while avoiding the obstacle. The control unit 140 transmits a current operation state (operations in progress, operations performed, and operations that could not be performed) of the robot 10 related to such operations to the operation terminal 20 through the communication unit 143.

The arm driving unit 141 is a device for driving the arm 121, and can be composed using, for example, a motor. The arm driving unit 141 drives the arm 121 and the hand 122 based on the control signal supplied from the control unit 140.

The moving unit driving unit 142 is a device for driving the moving unit 101, and can be composed using, for example, a motor. The moving unit driving unit 142 drives the moving unit 101 based on the control signal supplied from the control unit 140.

The communication unit 143 can communicate with each of the operation terminal 20 and the management server 30 in a wired or wireless manner. The communication unit 143 can transmit and receive information such as the operation signals, the captured data, and the voice data. For example, the communication unit 143 may transmit and receive the captured data and the voice data to and from the operation terminal 20 through real-time communication using Web Real-Time Communication (WebRTC) by a web browser or a mobile application. The communication unit 143 may receive the operation signal from the operation terminal 20 or transmit the current operation state to the operation terminal 20 according to a predetermined communication protocol (e.g., WebSocket).

The storage unit 144 stores the captured data and the voice data acquired from the stereo camera 131 and the microphone 132, and the data received from the operation terminal 20 (e.g., the voice data and the display data). In addition, the display data such as texts and pictures necessary for communication may be stored in the storage unit 144. The display data may be, for example, a list of events to be held at a venue where the robot 10 is provided or a diagram used for navigation. Examples of the diagrams used for navigation include a floor plan of the venue (in particular, a floor plan showing the environment around the robot 10) and a diagram showing access from the venue to nearby transportation facilities. The control unit 140 can read the stored data in response to the operation signal from the operation terminal 20 and then display the data on the display panel 134.

The configuration of the robot 10 is an example, and in the communication system 1 according to this embodiment, the configuration of the robot 10 is not limited to the above configuration.

<Configuration of Operation Terminal>

Next, the operation terminal 20 will be described. As shown in FIG. 1, the operation terminal 20 is a terminal for an operator to remotely operate the robot 10, and is a computer that can be composed using, for example, a personal computer or a tablet terminal. As shown in FIG. 1, the operation terminal 20 includes a camera 201 and a display unit 202 from the standpoint of appearance.

Figure 4:
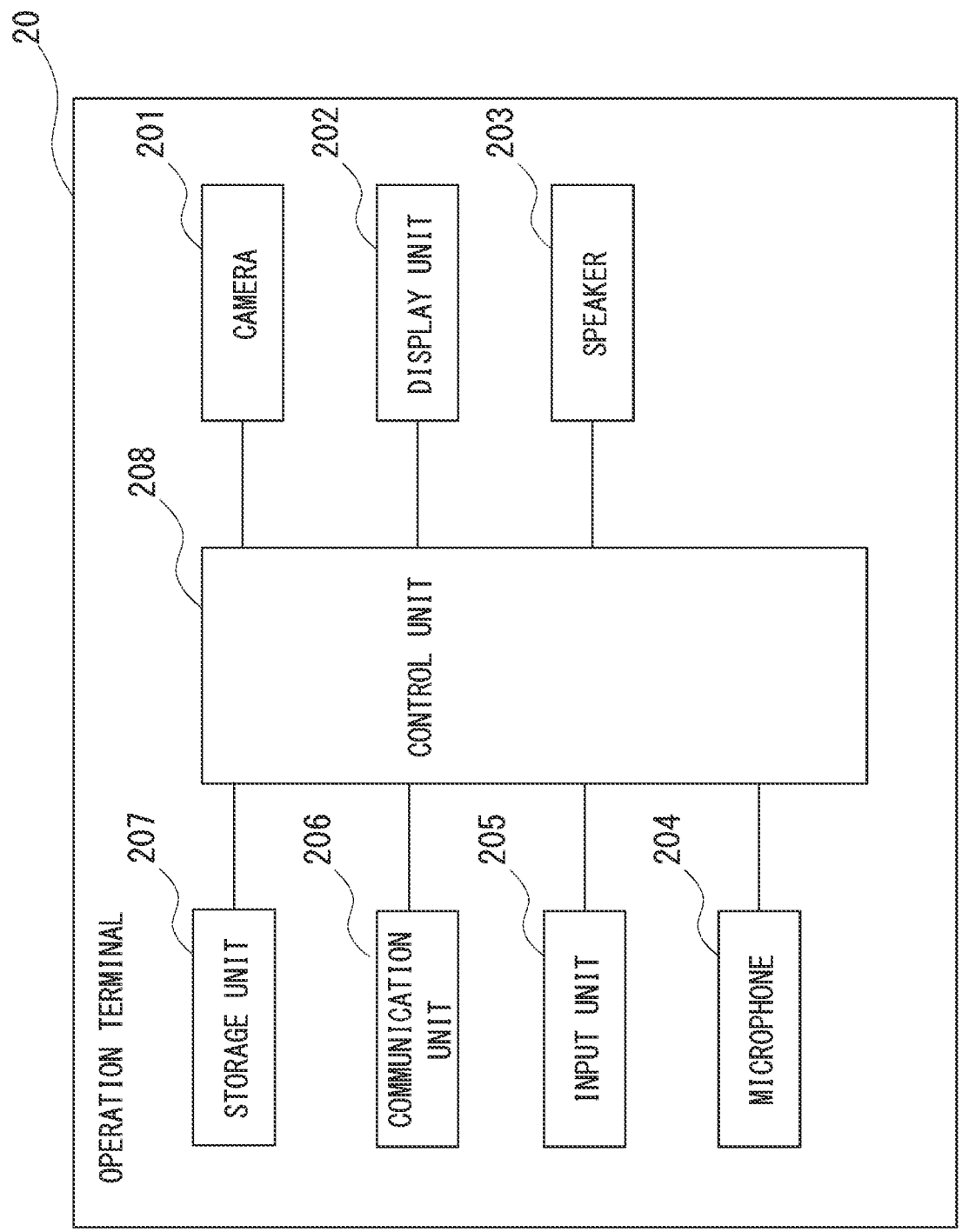
FIG. 4 is a block diagram showing an example of an operation terminal according to the first embodiment.

FIG. 4 is a block diagram for explaining a system configuration of the operation terminal. As shown in FIG. 4, the operation terminal 20 includes the camera 201, the display unit 202, a speaker 203, a microphone 204, an input unit 205, a communication unit 206 (a specifying information transmission unit), a storage unit 207, and a control unit 208. The control unit 208 has a function of controlling the operation terminal 20. The camera 201, the display unit 202, the speaker 203, the microphone 204, the input unit 205, and the communication unit 206 are connected to the control unit 208.

The camera 201 captures an image of the operator of the operation terminal 20 in front of the display unit 202 of the operation terminal 20. The display unit 202 displays the captured data (the captured data includes, for example, an image of the person, information indicating the person area, and information about the calculated distance to the person) transmitted from the robot 10 and the current operation state of the robot 10. The speaker 203 converts the voice data (e.g., a voice of the person) received from the operation terminal 20 through the communication unit 143 into a voice and outputs the voice. Thus, the operator of the operation terminal 20 can confirm the face and voice of the person.

The microphone 204 converts sound generated around the operation terminal 20 and a voice of the person (e.g., a voice of the operator operating the operation terminal 20) into the voice data. The voice data may be transmitted to the communication unit 143 of the robot 10 through the communication unit 206.

The input unit 205 is a device for the operator to input information to the operation terminal 20. When the information is input to the input unit 205, various kinds of information for remotely operating the robot 10 is input. The control unit 208 transmits the input information as the operation signal from the communication unit 206 to the robot 10.

For example, the input unit 205 can be composed using a touch panel or a keyboard. For example, if the input unit 205 is composed using a touch panel, the operator can remotely operate the robot 10 by pressing an icon or the like displayed on the touch panel. When the input unit 205 is composed using a keyboard, the robot 10 can be remotely operated by, for example, inputting predetermined information through the keyboard.

When the image of the person and the information indicating the person area are displayed as the captured data on the display unit 202, the operator can select the person as the communication target person C by designating the display area of the person on the display unit 202 through the input unit 205. The designation may be made by the operator pressing the touch panel or input through the keyboard.

The remote operation performed according to the input through the input unit 205 is related to, for example, a movement of the entire robot 10, an operation of the arm 121 and the hand 122, an output of a voice from the speaker 133, and determination and change of the display details on the display panel 134, but is not limited to them.

The communication unit 206 can communicate with each of the robot 10 and the management server 30 in a wired or wireless manner. For example, the communication unit 206 transmits the information output from the control unit 208 to the robot 10, and also outputs the information transmitted from the robot 10 to the control unit 208, thereby executing a remote operation of the robot 10. The information transmitted and received by the communication unit 206 is as described above. For example, the communication unit 206 may transmit and receive the captured data and the voice data to and from the communication unit 143 using WebRTC, or may transmit the operation signal to the communication unit 143 using WebSocket, or may receive the current operation state from the communication unit 143.

The storage unit 207 can store information acquired from the camera 201, the speaker 203, the microphone 204, and the input unit 205 under the control of the control unit 208. The storage unit 207 may further store information such as the captured data and the voice data acquired from the robot 10 through the communication unit 206 under the control of the control unit 208.

The control unit 208 controls the processing of each unit of the operation terminal 20 and is connected to each of the components other than itself through a bus.

The control unit 208 can transmit the captured data acquired from the camera 201 and the voice data acquired from the microphone 204 (e.g., image data and voice data of the operator) to the robot 10 through the communication unit 206. The control unit 208 can transmit, as the operation signal, input information related to the remote operation of the robot 10 input from the input unit 205 to the robot 10 through the communication unit 206. Further, the control unit 208 may transmit the face image, the text information, and the picture information input or designated from the input unit 205 to the robot 10 through the communication unit 206 as the display data. As described above, the robot 10 can output the display data and the voice data from the speaker 133 and the display panel 134 as necessary.

The control unit 208 outputs the voice data received from the robot 10 through the communication unit 206 from the speaker 203 as a voice. The control unit 208 controls the display unit 202 to display the captured data received from the robot 10 through the communication unit 206. Further, the control unit 140 controls the display unit 202 to display the current operation state of the robot 10 received from the robot 10.

The control unit 208 can store various kinds of acquired information in the storage unit 207, and can read out or delete any stored information.

The above configuration of the operation terminal 20 is an example, and in the communication system 1 according to this embodiment, the configuration of the operation terminal 20 is not limited to the above configuration.

<Configuration of Management Server>

Next, the management server 30 will be described. As shown in FIG. 1, the management server 30 is a server for managing the robot 10. The management server 30 can communicate with each of the robot 10 and the operation terminal 20.

Figure 5:
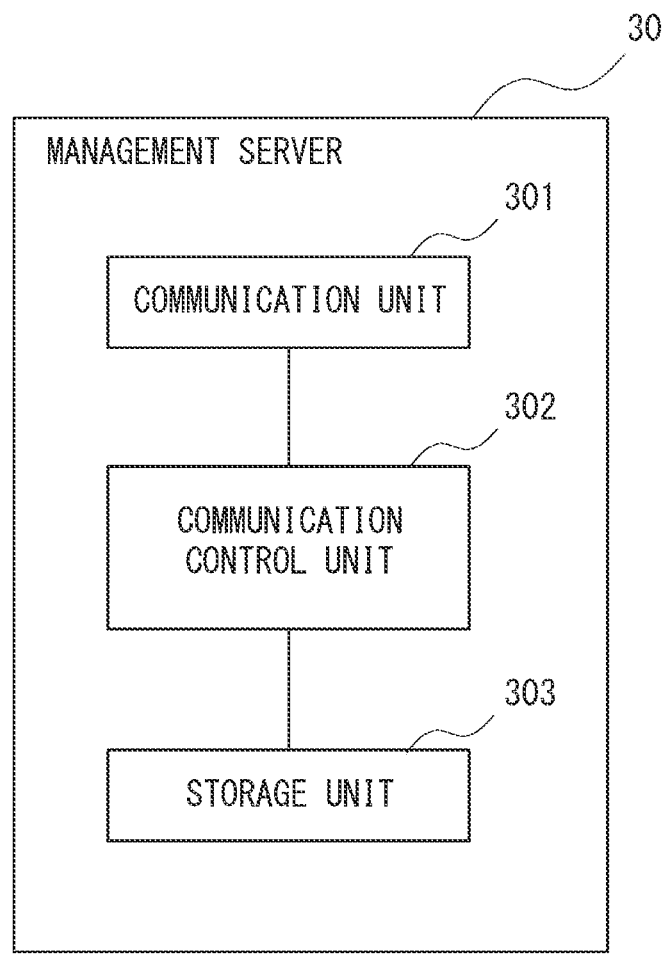
FIG. 5 is a block diagram showing an example of a management server according to the first embodiment.

FIG. 5 is a block diagram for explaining a system configuration of the management server. As shown in FIG. 5, the management server 30 includes a communication unit 301, a communication control unit 302, and a storage unit 303.

The communication unit 301 can communicate with the communication unit 143 of the robot 10 and the communication unit 206 of the operation terminal 20 in a wired or wireless manner. The communication control unit 302 communicates with the robot 10 and the operation terminal 20 through the communication unit 301 to assist communication of the captured data and the voice data between the robot 10 and the operation terminal 20.

For example, a case where the communication unit 143 and the communication unit 206 transmit and receive the captured data and the voice data using WebRTC will be considered. In this case, the communication control unit 302 controls a WebRTC client of the communication unit 143 and application displays of the communication unit 206, thereby enabling communication with each other. For example, the communication control unit 302 may start the application of the communication unit 206 when the robot 10 and the operation terminal 20 start communication. The communication unit 143 may also transmit information about status update of the application display to the communication unit 301. In this case, the management server 30 functions as a Web server.

The storage unit 303 stores various kinds of information necessary for the control of the communication control unit 302. The communication control unit 302 reads the information from the storage unit 303 when necessary and performs control.

The operation terminal 20 and the management server 30 may be configured to communicate with each of the plurality of robots 10 and manage each of the plurality of robots 10. The management server 30 may constitute the same computer system as the operation terminal 20.

<Description of Communication System Operation>

Figure 6A:
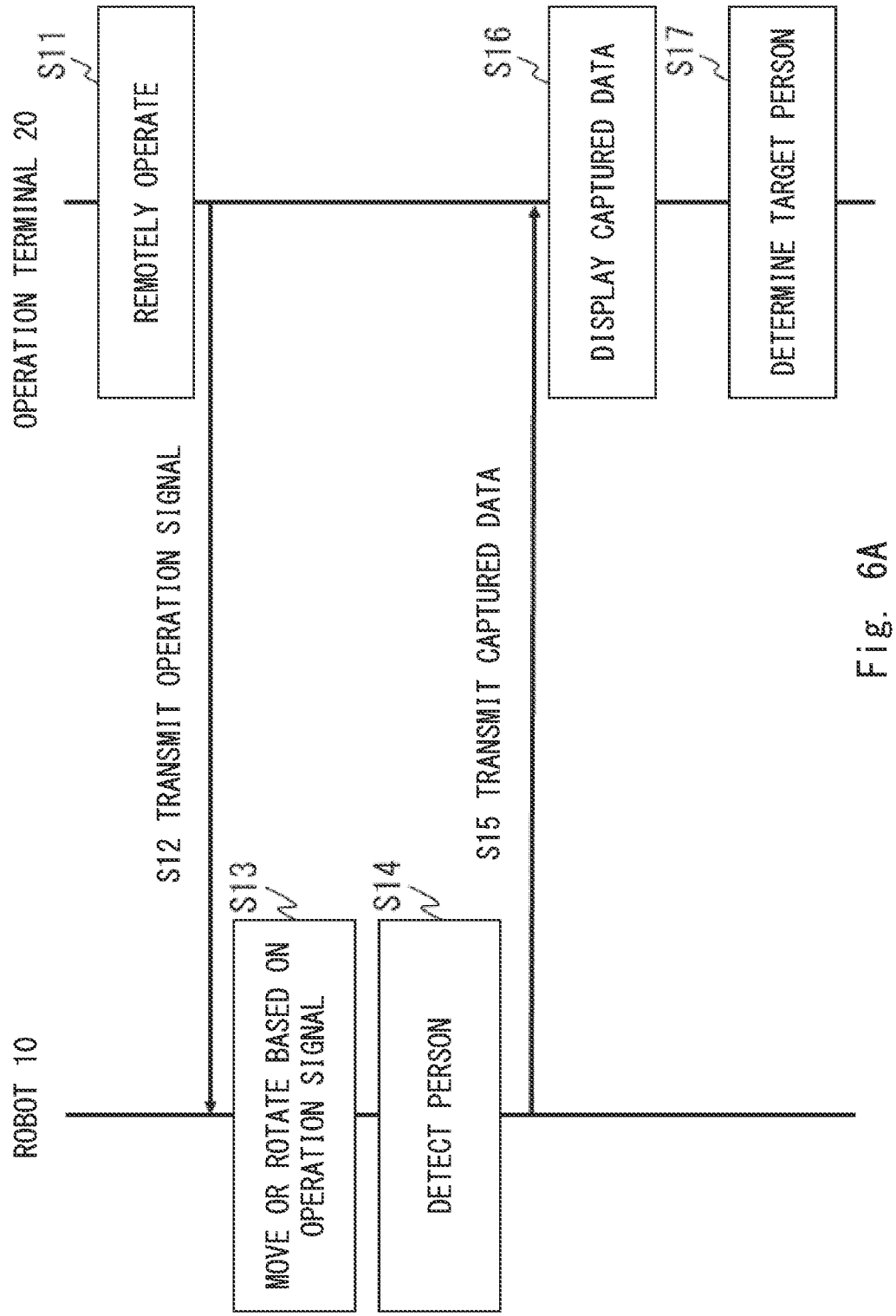
FIG. 6A is a sequence diagram showing an operation example of the communication system according to the first embodiment.
Figure 6B:
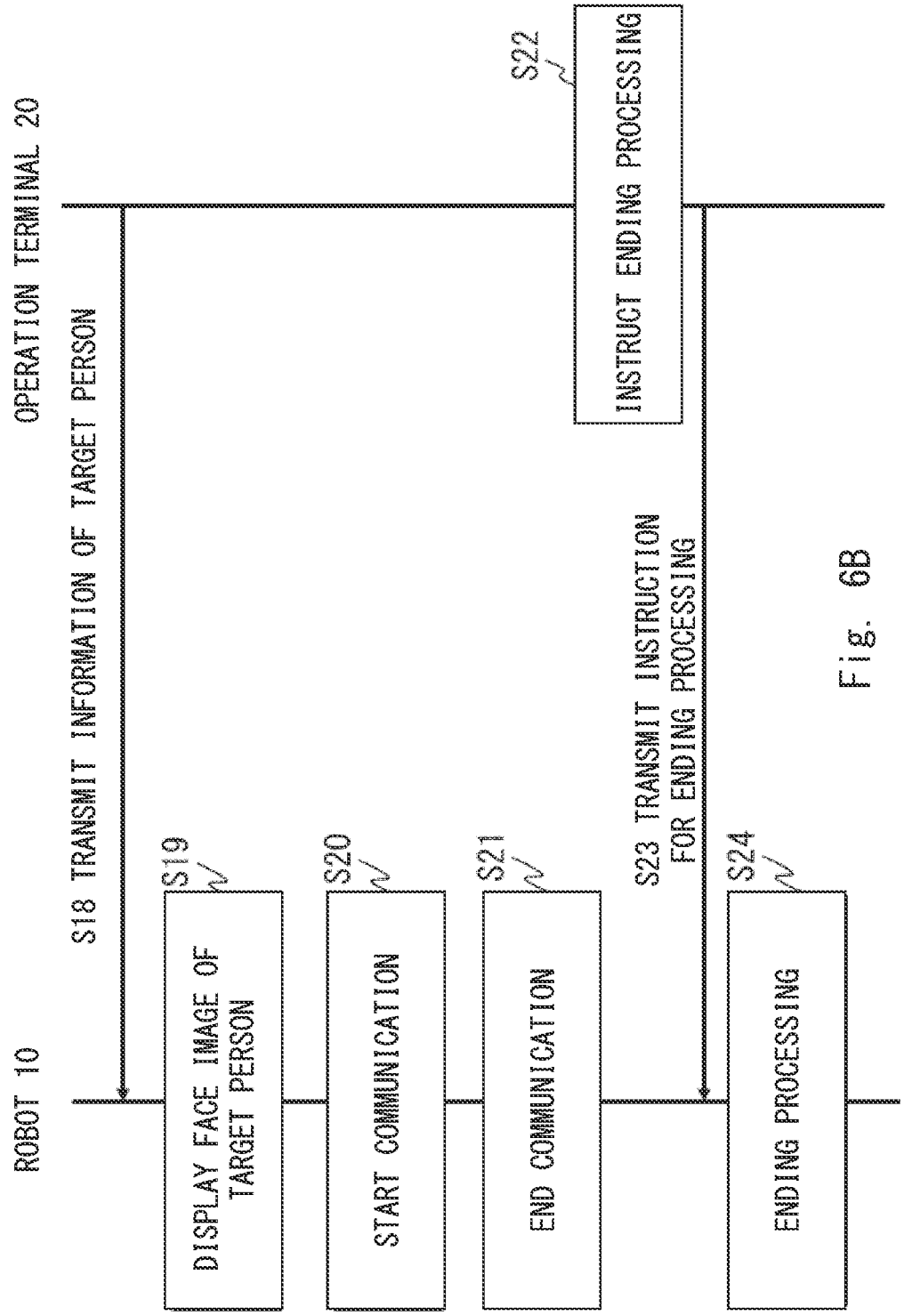
FIG. 6B is a sequence diagram showing an operation example of the communication system according to the first embodiment.

Next, an operation of the communication system according to this embodiment will be described with reference to the sequence diagrams shown in FIGS. 6A and 6B.

First, the operator on the operation terminal 20 side inputs a remote operation to the input unit 205 to operate the robot 10 so as to move or rotate the robot 10 in a desired direction (Step S11). The control unit 208 generates the operation signal related to the remote operation, and the communication unit 206 transmits the operation signal to the robot 10 (Step S12).

The communication unit 143 of the robot 10 receives the operation signal. The control unit 140 outputs the control signal for moving or rotating the robot 10 to the moving unit driving unit 142 based on the operation signal. When the moving unit driving unit 142 is driven in response to the control signal, the robot 10 performs the operation as instructed by the operator (Step S13).

When persons are detected in the captured data captured by the stereo camera 131 (Step S14), the robot 10 calculates distances to all the detected persons. The details are as described above. Then, the robot 10 transmits the information indicating all the detected person areas and the distances to the persons, together with the captured data acquired from the stereo camera 131, to the operation terminal 20 through the communication unit 143 (Step S15). The captured data captured by the stereo camera 131 is temporarily stored in the storage unit 144.

The communication unit 206 of the operation terminal 20 receives the transmitted captured data, and the control unit 208 controls the display unit 202 to display the captured data (Step S16). The operator designates one person from among the displayed one or the plurality of persons through the input unit 205, thereby determining the target person C to be communicated with from among the persons present in the vicinity of the robot 10 (Step S17).

The communication unit 206 of the operation terminal 20 transmits the specifying information specifying the selected target person C (Step S18). The communication unit 143 of the robot 10 receives the specifying information.

The control unit 140 performs processing for communicating with the target person C based on the received specifying information. However, if the robot 10 simply speaks to the target person C, the target person C may not notice. Therefore, the robot 10 indicates to the target person C that he/she is a communication target as follows.

The control unit 140 functions as a specifying unit for specifying the target person C based on the specifying information received in Step S18, extracts a face image of the target person C (specifically, personal information related to the target person C is acquired), and controls the display panel 134 to display the face image (Step S19). The face image may be an actual image of a still image or a moving image obtained by tracking a face area of the target person C extracted from moving image data captured by the stereo camera 131. In addition, instead of using the actual image of the target person C, the control unit 140 may generate a processed image obtained by processing the actual image, and control the display panel 134 to display the processed image. A detailed description of the processed image is as described above. The image to be displayed on the display panel 134 is temporarily stored in the storage unit 144.

The control unit 140 may further move the robot 10 by a predetermined distance in a direction of the target person C in association with the processing of Step S19. The predetermined distance is shorter than the distance between the robot 10 and the target person C. This movement may be performed automatically by the control unit 140, or may be performed by the operator remotely operating the robot 10 through the operation terminal 20. In addition, in Step S19, the control unit 140 may execute processing such as controlling the display panel 134 to further emit light in order to appeal to the target person C.

When the control unit 140 detects that the target person C has noticed the robot 10, the robot 10 starts communication (Step S20). Here, the control unit 140 detects that the target person C has noticed the robot 10, for example, when it determines any of the following states:
(a) When the control unit 140 detects that a line of sight of the target person C is at the display panel 134 of the robot 10 based on the captured data of the stereo camera 131 using techniques such as face authentication and face detection.
(b) The control unit 140 detects that a distance to the robot 10 when the target person C has approached the robot 10 or a velocity at which the target person C has approached the robot 10 after the display panel 134 starts to display the face image of the target person C is greater than or equal to a predetermined threshold.
(c) When the display panel 134 is a touch panel and the control unit 140 detects that the target person C has touched the display panel 134.

Note that the predetermined threshold in (b) is stored in the storage unit 144 and is used for the determination by the control unit 140.

When the communication is started, the control unit 140 outputs the voice data stored in the storage unit 144 as a voice from the speaker 133. For example, a voice such as "Can I help you?" is output from the speaker 133. The control unit 140 may control the display panel 134 to display the display data stored in the storage unit 144 in place of or in addition to the voice output from the speaker 133. The display data is, for example, a home screen for the target person C to acquire information.

When the target person C utters a voice, the voice is transmitted to the operation terminal 20 and the operator hears it. In response to the voice, the operator instructs the robot 10 to perform an operation for the robot 10 to communicate with the target person C by remote control through the input unit 205. This operation is, for example, an operation to output a voice from the speaker 133, to change the screen on the display panel 134, to move the arm 121 or the hand 122, or the like. The operator may also utter his or her own voice to the speaker 203, so that the voice is output from the speaker 133 of the robot 10. In this case, the target person C and the operator communicate through the communication system 1.

In addition, the operator may operate the arm 121 and the hand 122 of the robot 10 by a remote operation to perform an operation of passing goods near the robot 10 to the target person C.

After the communication, the target person C ends the communication (Step S21). Here, for example, one of the following states is assumed as the end of communication.
(d) When the control unit 140 detects that the distance the target person C has moved away from the robot or velocity at which the target person C has moved away from the robot 10 is equal to or greater than a predetermined threshold.
(e) When a period of time during which the target person C has not spoken to the robot 10 continues for a predetermined period of time or longer.
(f) When the display panel 134 is a touch panel and the period of time during which the target person C has not touched the display panel 134 continues for a predetermined period of time or longer.

When the operator of the operation terminal 20 determines that the communication between the robot 10 and the target person C has been ended, the operator remotely operates the robot 10 through the input unit 205 so as to execute ending processing of the communication (Step S22). The communication unit 206 of the operation terminal 20 transmits an instruction for the ending processing to the robot 10 (Step S23).

The communication unit 143 of the robot 10 receives the instruction for the ending processing. The control unit 140 executes the ending processing such as stopping the voice output from the speaker 133 and changing the screen displayed on the display panel 134 to an initial screen (the screen displayed before Step S19) (Step S24). At this stage at the latest, the display panel 134 does not display the actual image or the processed image of the target person C with whom the robot 10 has been communicating.

Further, in Step S24, the control unit 140 may execute personal information protection processing for deleting the actual image or the processed image of the target person C stored in the storage unit 144 for use in Step S19. In addition, the control unit 140 may refer to the captured data temporarily stored in the storage unit 144 and in which the target person C has been captured in the past, and further delete the captured data from the storage unit 144.

The processing of FIGS. 6A and 6B described above may be modified as follows.

In the above Steps S11 to S13, the robot 10 is moved and rotated by remote control from the operation terminal 20. However, the control unit 140 may automatically move or rotate the robot 10 even when there is no instruction from the outside. For example, the control unit 140 may control the moving unit driving unit 142 once every several to 10 seconds to move the robot 10 to a predetermined distance or rotate the robot 10 a predetermined angle. The control unit 140 can execute this operation in the processing of Step S19 or before the processing of Step S19. Further, in the captured data of the stereo camera 131, when a person is present within a distance of a predetermined threshold from the robot 10 or when there is a person whose distance to the robot 10 when he/she has approached the robot 10 or the velocity at which the person has approached the robot is greater than or equal to a predetermined threshold from a predetermined past time to the present, the control unit 140 may stop this operation and control the robot 10 so that it stands still.

In the above Step S14, when the robot 10 detects the target person C in the captured data captured by the stereo camera 131, the distance to the target person C is calculated. However, the distance between the robot 10 and the target person C may be calculated by the control unit 208 on the operation terminal 20 side using the captured data acquired from the stereo camera 131. The control unit 208 may extract the voice data of the target person C from the voice data acquired from the microphone 132, and further use the voice data to calculate the distance to the target person.

In Step S17, information indicating a person who is a candidate for the target person C is displayed on the display unit 202 of the operation terminal 20, and the operator selects one of the persons through the input unit 205 to determine the target person C. However, when a plurality of persons are present in the captured data, the operation terminal 20 may select one or a plurality of persons from among them as the candidate for the target person C and display the selected person on the display unit 202. For example, the control unit 208 may select at least one of a person closest to the robot or a person within a distance of a predetermined threshold from the robot 10 from among the plurality of persons present in the captured data as the candidate for the target person C.

Alternatively, if the captured data is a moving image, the control unit 208 may select, as the candidate for the target person C, a person whose distance to the robot 10 when he/she has approached the robot 10 or velocity at which the person has approached the robot 10 is equal to or greater than a predetermined threshold from the predetermined past time (e.g., several to 10 seconds before) to the present. This is because, in this case, it is assumed that the person approaching the robot 10 approaches the robot 10 with interest.

The selected person is highlighted and displayed on the display unit 202. For example, the control unit 208 can display the selected person as a whole or a part thereof (e.g., a face) by surrounding it with a dark frame on the display unit 202, or by emitting or flashing light.

By operating the input unit 205, the operator can determine the person selected by the control unit 208 as the target person C. When the control unit 208 does not determine the selected person as the target person C, it is also possible to input that the person selected by the control unit 208 is not determined as the target person C by operating the input unit 205. In response to this input, the control unit 208 stops the highlight display on the display unit 202, and displays all the persons in the captured data captured by the stereo camera 131 in the same manner as in Step S17. The operator operates the input unit 205 to select one of the persons as the target person C. The predetermined threshold used for the selection may be stored in the storage unit 207 or may be set by the operator.

Further, the control unit 140 of the robot 10 may determine whether a predetermined person captured in the captured data as the candidate for the target person C based on the distance to the robot. The control unit 140 may determine, for example, a person who satisfies at least one of the following conditions: a person closest to the robot 10, a person who is within a distance of a predetermined threshold from the robot 10, and a person whose distance to the robot 10 when he/she approached the robot 10 or velocity at which he/she has approached the robot 10 is equal to or greater than the predetermined threshold from the predetermined past time to the present. For a person who satisfies at least one of the above conditions, the control unit 140 may further add information emphasizing the presence of the person to the captured data and transmit the captured data with the added information to the operation terminal 20. Alternatively, the control unit 140 may generate information indicating the person area and information about the distance to the person only for the person satisfying at least one of the above conditions, and transmit the generated information to the operation terminal 20 together with the captured data.

In the above Step S19, the control unit 140 may display the position information of the target person C together with the actual image or the processed image on the display panel 134. The position information of the target person C can be acquired from the captured data captured by the stereo camera 131. The control unit 140 displays the position information of the target person C by information such as drawings and texts showing the positional relation between the robot 10 and the target person C.

In Step S19, the face image (the actual image or processed image) may be generated by the control unit 208 of the operation terminal 20 instead of the control unit 140 and then transmitted to the robot 10. The communication unit 143 functions as an acquisition unit for acquiring the face image. The control unit 140 displays the face image on the display panel 134.

Without performing the processing of Steps S22 and S23, the control unit 140 of the robot 10 may automatically determine the states (d) to (f) to determine the end of communication. The value of the predetermined period of time in (e) and (f) is stored in the storage unit 144 and is used for determination by the control unit 140. When the end of the communication is determined, the control unit 140 executes the processing of Step S24.

In Step S24, the control unit 140 may output a notification to the operation terminal 20 that the information of the target person C is deleted. When the operation terminal 20 temporarily stores the actual image or the processed image of the target person C and the captured data in which the target person C is captured in the storage unit 207, the control unit 208 may, upon receiving the notification, delete at least one of the actual image or the processed image of the target person C and the captured data in which the target person C is captured from the storage unit 207.

If the processed image of the target person C is generated in Step S19, the processed image may not necessarily be deleted from the storage unit 144 in Step S24. This is because it is considered that the personal information protection processing has already been performed in the processing of generating the processed image.

Note that the robot 10 may include another type of camera as the imaging unit instead of the stereo camera. An imaging apparatus which is an apparatus different from the robot 10 may be provided in place of the imaging unit provided in the robot 10. The imaging apparatus captures an image of a person in the vicinity of the robot 10 and transmits the captured data to the operation terminal 20. The imaging apparatus may extract at least a part of the person as the person area from the captured data and transmit information indicating the person area to the operation terminal 20 together with the captured data. Further, the imaging apparatus may extract at least a part of the person as the candidate for the target person C from the captured data as the person area based on the distance between the person present in the vicinity of the robot 10 and the robot 10, and transmit information indicating the person area to the operation terminal 20 together with the captured data. However, this extraction processing may be executed on the robot 10 side to which the captured data is output from the imaging apparatus. The details of this processing are as described above. The imaging apparatus or the robot 10 transmits the extracted captured data to the operation terminal 20, and the operation terminal 20 performs the above processing using the transmitted captured data.

<Description of Effects>

Next, effects of the communication system according to this embodiment will be described.

In the first embodiment, the robot 10 transmits the captured data of a person present in the vicinity of the robot 10 captured by the stereo camera 131 to the operation terminal 20. The operation terminal 20 transmits, based on the operation of the operator, the specifying information for specifying the target person C from among persons present in the vicinity of the robot 10. The control unit 140 displays, on the display panel 134, the actual image or the processed image, which is the personal information related to the target person C specified by the specifying information. In this manner, since the robot 10 makes the target person C visually recognize the information about the target person C, it can effectively indicate to the target person C that he/she is a communication target. The robot 10 can communicate with the person by capturing a face image of the person even when an unspecified number of persons are present such as at an event and the personal information of the person is not provided in advance.

The control unit 140 extracts at least a part of the person as the person area from the captured data, and the communication unit 143 can transmit information indicating the person area together with the captured data to the operation terminal 20. By doing so, the operator can easily select the target person C from among the persons displayed on the display unit 202 by the information indicating the person area.

Further, the control unit 140 may extract at least a part of the person as the candidate for the target person C from the captured data as the person area based on the distance between the person present in the vicinity of the robot 10 and the robot 10, and the communication unit 143 can transmit information indicating the person area to the operation terminal 20 together with the captured data. This processing also makes it easier for the operator to select the target person C. In addition, the control unit 140 previously selects a person who is considered to be trying to communicate with the robot 10 in consideration of the distance to the robot 10. Thus, the operator can more accurately select the person who is trying to communicate as the target person C.

In Step S19, the control unit 140 may generate the processed image using the actual image and then display the processed image on the display panel 134. In Step S24, the control unit 140 may delete the actual image or the processed image of the target person C stored in the storage unit 144 for use in Step S19. In this manner, the control unit 140 can control the display panel 134 to display the face image so that a set of the processing for displaying the face image and the protection processing for protecting the face image, which is the personal information, is executed. Therefore, it is difficult for a third party to specify the individual based on the display data of the robot 10, and thus the target person C can communicate with the robot 10 with a sense of security.

By the control unit 140 generating the processed image and controlling the display panel 134 to display the processed image on the display panel 134, it is possible to further reduce the possibility that the individual may be specified by a third party as compared with the case where the robot 10 displays the actual image as it is on the display panel 134. Further, since the control unit 140 deletes the image of the target person C from the storage unit 144, the target person C is given a sense of security that the personal information is appropriately managed, so that the target person C can communicate with the robot 10 with a sense of security.

Furthermore, the control unit 140 can control the display panel 134 to display the position information of the target person C to more effectively indicate to the target person C that the he/she is a communication target.

The operation terminal 20 in the communication system 1 displays the transmitted captured data on the display unit 202, and the communication unit 206 transmits the specifying information related to the target person C designated by the operator to the robot 10. In this way, the operator of the operation terminal 20 can determine the target person C for the robot 10.

Further, the robot 10 or the imaging apparatus in the communication system 1 may extract the person area from the captured data, and the display unit 202 of the operation terminal 20 may display the captured data and information indicating the person area to the operator. Alternatively, the operation terminal 20 may extract the person area from the captured data, and the display unit 202 may display the captured data and information indicating the person area to the operator. By doing so, the operator can easily select the target person C from among the persons displayed on the display unit 202 by the information indicating the person area.

The robot 10 or the imaging apparatus may extract the person area related to the target person C from the captured data, and the display unit 202 of the operation terminal 20 may display the captured data and information indicating the person area to the operator. Alternatively, the operation terminal 20 may extract the person area related to the target person C from the captured data, and the display unit 202 may display the captured data and information indicating the person area to the operator. This processing also makes it easier for the operator to select the target person C. Moreover, the operator can more accurately select the person who is trying to communicate as the target person C.

Second Embodiment

Although the communication system 1 including the robot 10 and the operation terminal 20 has been described in the first embodiment, the communication with the target person C can be performed by the robot 10 alone. In a second embodiment, details of such communication will be described. In the following description, the configuration and processing contents different from those according to the first embodiment will be described, and the description of the configuration and processing contents common to those according to the first embodiment will be omitted as appropriate.

Figure 7:
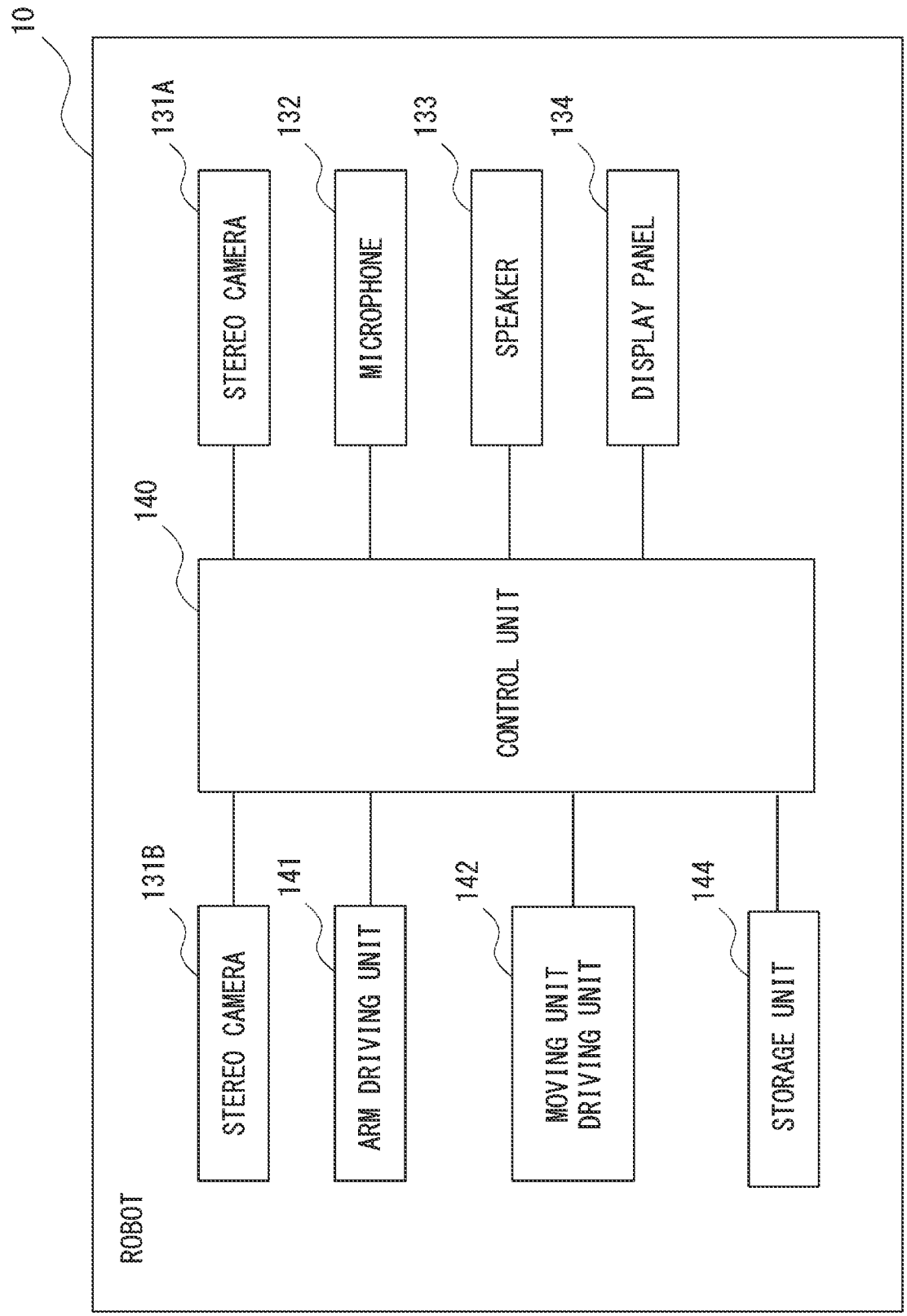
FIG. 7 is a block diagram showing an example of a robot according to a second embodiment.

An external configuration of a robot 10 according to the second embodiment is as shown in FIG. 2. Internal components of the robot 10 are as shown in FIG. 7. As shown in FIG. 7, the robot 10 does not have the communication unit 143 for transmitting and receiving information to and from the outside. The control unit 140 automatically controls each unit of the robot 10 to execute the operation of the robot 10.

For example, the control unit 140 detects a person or determines the target person C based on the captured data and the distance information acquired by the stereo camera 131 and the voice data acquired by the microphone 132. The captured data, the voice data, and the like are stored in the storage unit 144 as appropriate. The control unit 140 reads movement and operation logics from the storage unit 144 to control each of the arm driving unit 141 and the moving unit driving unit 142, thereby controlling the movement and operation of the robot 10. As an example, when a person is detected nearby, the control unit 140 may control the moving unit 101 so as to move to avoid the person or so as to direct the head part 113 toward the person. In addition, the control unit 140 may control the arm 121 and the hand 122 so as to operate in association with each other in accordance with the operation of the person, to pass an object to the person, or to perform communication such as handshake. For example, the control unit 140 may execute such an operation when the display panel 134 is a touch panel and an instruction input through the touch panel is received from the target person C.

Further, the control unit 140 may output a voice related to the communication according to the situation from the speaker 133 by reading the voice data from the storage unit 144. The control unit 140 generates the face images, the text information, and the picture information displayed on the display panel 134 by itself or reads them from the storage unit 144.

The control unit 140 determines whether or not there is a target person C with which the robot 10 communicates from among one or a plurality of detected persons based on the information indicating the person area and the calculated distances to the persons. For example, the control unit 140 may select, as the target person C, the person closest to the robot 10 or the person within a distance of a predetermined threshold from the robot 10 from among the plurality of persons present in the captured data. Alternatively, if the captured data is a moving image, the control unit 208 may select, as a candidate for the target person C, a person whose distance to the robot 10 when he/she has approached the robot 10 or velocity at which the person has approached the robot 10 is equal to or greater than a predetermined threshold from a predetermined past time (e.g., several to 10 seconds before) to the present. This is because, in this case, it is assumed that the person approaching the robot 10 approaches the robot 10 with interest. If the above conditions are not satisfied, the control unit 140 determines that there is no target person C with which the robot 10 communicates.

The configuration of the robot 10 is an example, and in the communication system 1 according to this embodiment, the configuration of the robot 10 is not limited to the above configuration.

<Description of Robot Operation>

Figure 8:
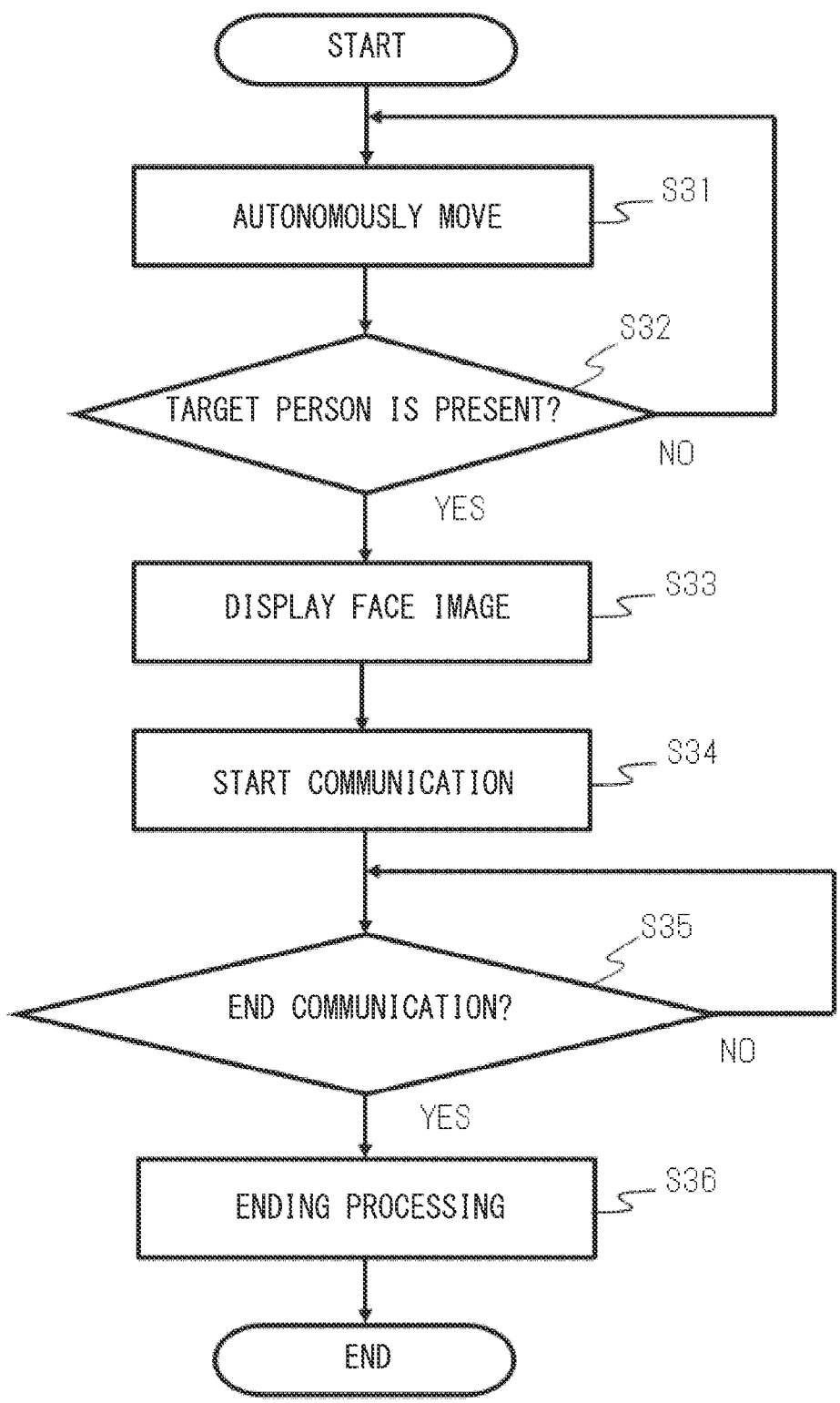
FIG. 8 is a flowchart showing an example of an operation of the robot according to the second embodiment.

Next, an operation of the robot according to this embodiment will be described with reference to a flowchart shown in FIG. 8.

First, the control unit 140 of the robot 10 reads the movement logic from the storage unit 144 to move the robot 10 autonomously (Step S31).

When a person is detected in the captured data captured by the stereo camera 131, the control unit 140 determines whether or not this person becomes the target person C with which the robot 10 will communicate (Step S32). In this way, the control unit 140 determines whether or not the target person C is present. As described above, the robot 10 can determine the target person C based on the information indicating the person area and the calculated distance to the person.

If the target person C is not present (No in Step S32), the control unit 140 returns to Step S31 to execute the processing. On the other hand, if the target person C is present (Yes in Step S32), the control unit 140 extracts the face image of the target person C using the captured data of the target person C (i.e., the personal information related to the target person C is acquired). Then, the control unit 140 displays the face image on the display panel 134 (Step S33). As described above, the displayed face image may be the actual image or the processed image.

When the control unit 140 detects that the target person C has noticed the robot 10, the robot 10 starts communication (Step S34). Details of this detection are as described in the first embodiment. After the communication is started, the control unit 140 executes the operation or outputs the voice through the microphone 132 based on the voice of the target person C acquired from the speaker 133 and the operation of the target person C captured by the stereo camera 131.

The control unit 140 determines whether or not the communication with the target person C has ended after a predetermined period of time has elapsed since the start of the communication (Step S35). Details of this detection are also described in the first embodiment.

If the communication has not ended (No in Step S35), the control unit 140 continues the communication, and once the predetermined period of time has elapsed, the determination processing in Step S35 is performed again. On the other hand, when the communication has ended (Yes in Step S35), the control unit 140 executes ending processing such as stopping the voice output from the speaker 133 and changing the screen displayed on the display panel 134 to the initial screen (Step S36). Further, the control unit 140 may execute personal information protection processing for deleting the actual image, the processed image, the captured data, and the like of the target person C stored in the storage unit 144.

Note that the robot 10 may include another type of camera as the imaging unit instead of the stereo camera. An imaging apparatus which is an apparatus different from the robot 10 may be provided in place of the imaging unit provided in the robot 10. This imaging apparatus captures an image of a person in the vicinity of the robot 10 and transmits the captured data to the robot 10. Note that the processing for extracting at least a part of the person as a person area or the processing for extracting at least a part of the person who is the candidate for the target person C as the person area from the captured data may be executed by either the robot 10 or the imaging apparatus.

<Description of Effects>

Next, the effects of the robot 10 according to this embodiment will be described.

In the second embodiment, as in the first embodiment, the control unit 140 of the robot 10 can control the display panel 134 to display the face image so that a set of the processing for displaying the face image and the protection processing for protecting the face image, which is the personal information, is executed. In this way, the robot 10 can effectively indicate to the target person C that he/she is a communication target.

Further, since the robot 10 has the stereo camera 131 for capturing the face image, the robot 10 alone can effectively indicate to the target person C that he/she is a communication target using the face image.

The control unit 140 can specify the communication target person based on the distance between the person present in the vicinity of the robot 10 and the robot 10. Thus, the robot 10 can accurately determine the target person C who is trying to communicate with the robot 10. Other effects are the same as those described in the first embodiment.

Note that the present disclosure is not limited to the embodiments described above, and may be appropriately modified without departing from the purport thereof. For example, in the first and second embodiments, the robot 10 or the operation terminal 20 may preferentially select a person satisfying a predetermined condition from among the persons in the detected captured data as the candidate for the target person C. The predetermined condition may be, for example, that a person is a child. Whether or not a certain person is a child can be determined by the robot 10 or the operation terminal 20 based on at least any one of the face image of the person, the clothing of the person, the height of the person, and the like in the image of the person. Alternatively, a person who is considered to require some assistance, such as a person on a wheelchair, can be determined in a manner similar to the above. As described in the first embodiment, the robot 10 or the operation terminal 20 may control the display unit 202 to preferentially display the determined person with highlight as the candidate for the target person C.

In the first embodiment, the management server 30 may not necessarily be provided in the communication system 1. Further, another terminal may be provided in the communication system 1. Examples of another terminal include a tablet terminal for a staff to check the state of the robot 10 near the robot 10.

As the image of the target person C displayed on the display panel 134, an image other than an image of the front of the target person C (e.g., a back shot of the person) may be used. For example, when the target person C is specified, the control unit 140 refers to the past captured data (e.g., moving image data) stored in the storage unit 144, and specifies and extracts an image other than an image of the front face of the target person C in the past captured data. By doing so, the control unit 140 can display the image other than the image of the front of the target person C. The image may be processed as described in the embodiments.

The personal information of the target person C displayed on the display panel 134 may be different from that shown in the embodiments. For example, a computer capable of acquiring personal information of a person may be provided in the communication system 1, and the robot 10 may acquire the personal information of the person by performing processing in association with the computer.

For example, at the entrance of an event hall where the robot 10 is provided, a camera for capturing face images of event participants, and a reception computer connected to the camera for presenting the captured face images of the event participants and the reception numbers of the participants in association with each other may be provided. The reception computer associates the face images of the event participants with the reception numbers of the participants and stores them in its own storage unit.

When the operation terminal 20 determines the target person C in Step S17, the operation terminal 20 transmits an inquiry of the reception number including the information of the face image of the target person C to the reception computer. The reception computer transmits the reception number associated with the received face image to the operation terminal 20 as the personal information in response to the inquiry. The operation terminal 20 transmits the reception number to the robot 10 in Step S18. The robot 10 displays the reception number in Step S19. Since it is difficult for a third party to specify the target person C with information about the reception number, displaying the reception number corresponds to "protection processing to protect personal information". Thus, the robot can effectively indicate to the target person C that he/she is a communication target and can also protect the personal information. However, the robot 10 may display the actual face image or the processed image of the target person C on the display panel 134 in addition to the reception number.

In the above example, the operation terminal 20 transmits the inquiry to the reception computer. Alternatively, after the robot 10 acquires the specifying information of the target person C in Step S18, an inquiry including the information about the face image of the target person C may be transmitted to the reception computer. The reception computer transmits the reception number to the robot 10 in response to the inquiry, and the robot 10 displays the reception number in Step S19.

Further, in place of the reception number, other kinds of information such as pseudonyms and initials of the event participant, from which the event participant can recognize himself/herself, may be used. The robot 10 may independently display such information as the text information on the display panel 134, or may display such information together with the actual face image or the processed image of the target person C. Also in the robot 10 according to in the second embodiment, the processing for displaying the reception number and the like on the display panel 134 is achieved by transmitting an inquiry including the information about the face image to the reception computer and receiving the personal information such as the reception number from the reception computer when the robot 10 determines the target person C.

Figure 9:
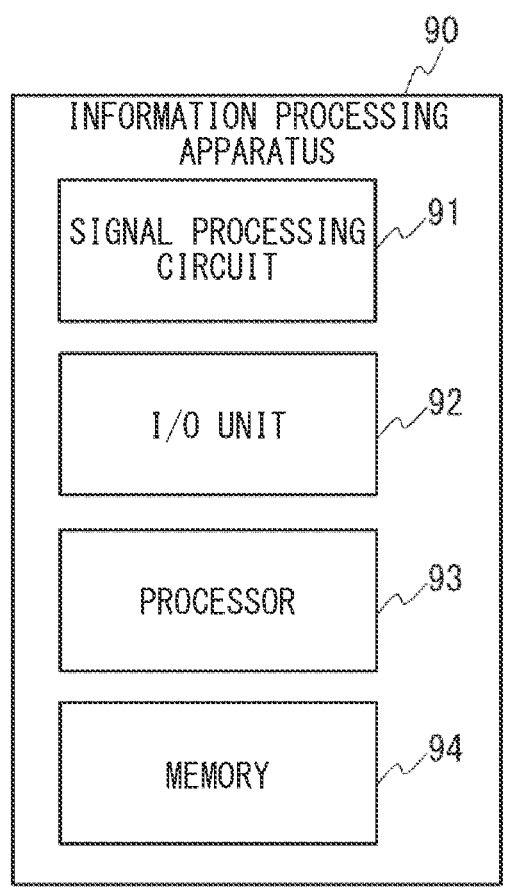
FIG. 9 is a block diagram showing a hardware configuration example of an information processing apparatus according to each embodiment.

FIG. 9 is a block diagram showing an example of a hardware configuration of an information processing apparatus that constitutes the robot 10, the operation terminal 20, and the management server 30 for executing the processing of the embodiments described above. Referring to FIG. 9, an information processing apparatus 90 includes a signal processing circuit 91, an I/O unit (input/output) 92, a processor 93, and a memory 94.

The signal processing circuit 91 is any circuit for processing and outputting signals under the control of the processor 93. The I/O unit 92 is a hardware interface for inputting and outputting information to and from a remote apparatus of the information processing apparatus 90.

The processor 93 reads software (computer programs) from the memory 94 and executes the software to thereby perform the processing of the apparatus described in the above embodiments. One or more of CPU (Central Processing Unit), MPU (Micro Processing Unit), FPGA (Field-Programmable Gate Array), DSP (Demand-Side Platform), and ASIC (Application Specific Integrated Circuit) may be used as the processor 93. The processor 93 reads software from the memory 94 and then executes the software to control the signal processing circuit 91, so that the signal processing circuit 91 executes functions of respective units except for the memory in each of the robot 10, the operation terminal 20, and the management server 30.

The memory 94 is composed of a volatile memory, a non-volatile memory, or a combination thereof. The number of memories 94 is not limited to one, and instead a plurality of memories may be provided. The volatile memory may be, for example, a RAM (Random Access Memory) such as DRAM (Dynamic Random Access Memory) or SRAM (Static Random Access Memory). The non-volatile memory may be, for example, ROM (Read Only Memory) such as PROM (Programmable Random Only Memory) or EPROM (Erasable Programmable Read Only Memory), or SSD (Solid State Drive).

Note that the memory 94 may include a memory included in the processor 93 in addition to one provided outside the processor 93. The memory 94 may also include a storage separated from a processor constituting the processor 93. In this case, the processor can access the memory 94 via, for example, the I/O unit 92.

In the example of FIG. 9, the memory 94 is used to store software modules. The processor 93 reads these software modules from the memory 94 and executes them to perform the processing described in the above embodiments.

As described above, one or more processors included in each of the apparatuses in the above-described embodiments execute one or more programs including instructions for causing a computer to perform the algorithm described with reference to the drawings. By this processing, the signal processing method described in each embodiment can be implemented.

The program shown above can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A communication method executed by a robot comprising:
    specifying a communication target person to be communicated with from among persons present in a vicinity of the robot;
    acquiring a back view image of the specified communication target person by a camera mounted on the robot;
    displaying the back view image on a display panel mounted on the robot to inform the communication target person of the back view image;
    receiving an operation signal corresponding to a remote operation of the robot;
    executing the remote operation in accordance with the operation signal;
    initiating communication with the communication target person upon determining a state corresponding to detecting that a velocity of the communication target person has approached the robot greater than or equal to a first predetermined threshold after the display of the back view image on the display panel;
    creating a processed image obtained by processing the back view image, the processed image being an avatar based on the back view image; and
    displaying the processed image on the display panel of the robot to inform the communication target person of the processed image, wherein
    the specifying the communication target person includes specifying personal information of the communication target person using a face image of the communication target person, the personal information indicating an initial of the communication target person;
    the specifying the communication target person further includes specifying the communication target person based on at least any one of clothing or a height of the communication target person among the persons present in the vicinity of the robot;
    the communication method further comprising displaying the personal information on the display panel mounted on the robot to inform the communication target person of the personal information together with the back view image; and
    the communication method further comprising stopping the remote operation, including a movement operation or a rotation operation, of the robot and controlling the robot to a still position when the velocity at which the communication target person has approached the robot, is greater than or equal to the first predetermined threshold from a predetermined past time to the present.

2. The communication method according to claim 1, the method further comprising:
    executing processing for deleting data of the back view image from the robot as a protection processing after the display of the back view image on the display panel.

3. The communication method according to claim 1, wherein
    the acquiring the back view image includes capturing the back view image.

4. The communication method according to claim 1, wherein
    the specifying the communication target person further includes specifying position information of the communication target person, and
    the position information is displayed on the display panel mounted on the robot to inform the communication target person of the position information together with the back view image.

5. The communication method according to claim 1, wherein
    the specifying the communication target person further includes specifying the communication target person based on a distance between the communication target person from among the persons present in the vicinity of the robot and the robot.

6. A robot comprising:
    one or more processors configured to specify a communication target person to be communicated with from among persons present in a vicinity of the robot;
    a camera configured to acquire a back view image of the communication target person specified by the one or more processors;
    the one or more processors configured to display the back view image on a display panel mounted on the robot to inform the communication target person of the back view image,
    the one or more processors being further configured to:
        receive an operation signal corresponding to a remote operation of the robot;
        execute the remote operation in accordance with the operation signal;
        initiate communication with the communication target person upon determining a state corresponding to detecting that a velocity of the communication target person has approached the robot greater than or equal to a first predetermined threshold after the display of the back view image on the display panel;
        create a processed image obtained by processing the back view image, the processed image being an avatar based on the back view image; and display the processed image on the display panel of the robot to inform the communication target person of the processed image, wherein the one or more processors are further configured to specify personal information of the communication target person using a face image of the communication target person, the personal information indicating an initial of the communication target person;

the one or more processors are further configured to specify the communication target person based on at least any one of clothing or a height of the communication target person among the persons present in the vicinity of the robot;

the one or more processors are further configured to display the personal information on the display panel mounted on the robot to inform the communication target person of the personal information together with the back view image; and the one or more processors are further configured to stop the remote operation, including a movement operation or a rotation operation, of the robot and controlling the robot to a still position when the velocity at which the communication target person has approached the robot, is greater than or equal to the first predetermined threshold from a predetermined past time to the present.

7. A non-transitory computer readable medium storing a program for causing a robot to execute:

specifying a communication target person to be communicated with from among persons present in a vicinity of the robot;

acquiring a back view image of the specified communication target person by a camera mounted on the robot;

displaying the back view image on a display panel mounted on the robot to inform the communication target person of the back view image;

receiving an operation signal corresponding to a remote operation of the robot;

executing the remote operation in accordance with the operation signal;

initiating communication with the communication target person upon determining a state corresponding to detecting that a velocity of the communication target person has approached the robot greater than or equal to a first predetermined threshold after the display of the back view image on the display panel;

creating a processed image obtained by processing the back view image, the processed image being an avatar based on the back view image; and displaying the processed image on the display panel of the robot to inform the communication target person of the processed image, wherein the specifying the communication target person includes specifying personal information of the communication target person using a face image of the communication target person, the personal information indicating an initial of the communication target person;

the specifying the communication target person further includes specifying the communication target person based on at least any one of clothing or a height of the communication target person among the persons present in the vicinity of the robot;

the communication method further comprising displaying the personal information on the display panel mounted on the robot to inform the communication target person of the personal information together with the back view image; and the communication method further comprising stopping the remote operation, including a movement operation or a rotation operation, of the robot and controlling the robot to a still position when the velocity at which the communication target person has approached the robot, is greater than or equal to the first predetermined threshold from a predetermined past time to the present.

8. The communication method according to claim 1, further comprising terminating the communication upon occurrence of one of the following states: detecting that the velocity at which the communication target person has moved away from the robot is greater than or equal to a second predetermined threshold, determining a first period of time at which the communication target person has not spoken to the robot continues for a first predetermined period of time or longer, or determining a second period of time that communication target person has not touched the display panel continues for a second predetermined period of time or longer.

9. The communication method according to claim 8, further comprising storing the back view image of the communication target person for a third predetermined period of time and deleting the back view image of the communication target person when terminating the communication with the communication target person.

* * * * *